United States Patent
Nakanishi et al.

[11] Patent Number: 6,096,234
[45] Date of Patent: Aug. 1, 2000

[54] CROSS-LINKED POLYMER SOLID ELECTROLYTE, METHOD OF MANUFACTURING CROSS-LINKED SOLID POLYMER ELECTROLYTE, COMPOSITE SOLID ELECTROLYTE, AND THIN SOLID CELL EMPLOYING COMPOSITE SOLID ELECTROLYTE

[75] Inventors: Toru Nakanishi, Tokyo; Kazuhiro Hirahara, Niigata-ken; Toshinobu Ishihara, Niigata-ken; Yoshinobu Isono, Niigata-ken; Atsushi Takano, Niigata-ken, all of Japan

[73] Assignee: Shin-Etsu Chemical Co., Ltd., Tokyo, Japan

[21] Appl. No.: 09/009,066

[22] Filed: Jan. 20, 1998

[30] Foreign Application Priority Data

Jan. 23, 1997 [JP] Japan ................................. 9-024267
Feb. 5, 1997 [JP] Japan ................................. 9-037147

[51] Int. Cl.$^7$ ...................................... H01M 6/18
[52] U.S. Cl. .................. 252/62.2; 429/192; 429/194; 525/327.3; 525/941
[58] Field of Search ................. 525/327.3, 941; 429/192, 194; 252/62.2

[56] References Cited

U.S. PATENT DOCUMENTS

| | | | |
|---|---|---|---|
| 5,102,752 | 4/1992 | Hope et al. | |
| 5,146,391 | 9/1992 | MacFarlane et al. | 361/525 |
| 5,219,681 | 6/1993 | Yamada et al. | 429/192 |
| 5,296,318 | 3/1994 | Gozdz et al. | |
| 5,378,558 | 1/1995 | Hope | |

FOREIGN PATENT DOCUMENTS

| | | |
|---|---|---|
| 3188151 | 8/1991 | Japan . |
| 0260925 | 8/1993 | Japan . |
| 2229826 | 8/1993 | Japan . |
| 5205515 | 8/1993 | Japan . |
| 5217416 | 8/1993 | Japan . |
| 2230667 | 10/1993 | Japan . |
| 7109321 | 4/1995 | Japan . |
| 7272759 | 10/1995 | Japan . |
| 9114294 | 9/1991 | WIPO . |

OTHER PUBLICATIONS

Abraham, K.M. and M. Alamgir, "Polymer Electrolytes Reinforced by Celgard Membranes," *Technical Papers Electrochemical Science and Technology*. J. Electrochem. Soc., vol. 142, No. 3, Mar. 1995 pp. 683–687.

Sun, L. And K. Higaki, "Solid Polymer Electrolyte Film and its Manufacture," pp. 284–285.

Scrosati, Bruno, "Challenge of Portable Power," *Nature*. vol. 373., Feb. 16, 1995. pp. 557–558.

Armand, Michel, "The History of Polymer Electrolytes," *Solid State Ionics*. 1994. pp. 309–319.

Kelly, I. E., J. R. Owen and C. H. Steele, "Poly(ethylene oxide) Electrolytes for Operation at Near Room Temperature," *Journal of Power Sources*. (1985) pp. 13–21.

*Primary Examiner*—Jeffrey C. Mullis
*Attorney, Agent, or Firm*—Loeb & Loeb, LLP

[57] ABSTRACT

There is disclosed a cross-linked polymer solid electrolyte and a method of manufacturing the same. A crosslinking agent is added to a block-graft copolymer composed of a polymer block chain A represented by formula I and a polymer block chain B represented by formula II; a high energy ray is irradiated to the block-graft polymer in order to crosslink the entire system; and an nonaqueous electrolytic solution is added to the block-graft polymer. There is also disclosed a composite solid electrolyte for use in a solid electrochemical element. The composite solid electrolyte includes an electrically insulating material, an alkali metal salt, a block-graft copolymer composed of a polymer block chain A represented by formula I and a polymer block chain B represented by formula II, and an aprotic organic solvent.

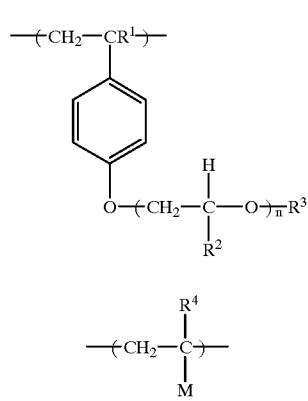

17 Claims, No Drawings

CROSS-LINKED POLYMER SOLID ELECTROLYTE, METHOD OF MANUFACTURING CROSS-LINKED SOLID POLYMER ELECTROLYTE, COMPOSITE SOLID ELECTROLYTE, AND THIN SOLID CELL EMPLOYING COMPOSITE SOLID ELECTROLYTE

BACKGROUND OF THE INVENTION

1. Field of the Invention

The present invention relates to a method of manufacturing a polymer solid electrolyte that is useful for primary and secondary cells, and particularly to a cross-linked polymer solid electrolyte that is useful for film-like polymer cells. The present invention also relates to a cross-linked polymer solid electrolyte itself. Further, the present invention relates to an electrolyte for use in solid electrochemical elements such as primary cells, secondary cells, capacitors, electrochromic displays, and sensors. Moreover, the present invention relates to electrochemical elements employing the electrolyte, particularly thin solid cells.

2. Description of the Related Art

As solid electrolyte, inorganic materials such as β-alumina, $Li_2TiO_3$, $RbAg_4I_5$, AgI, and tungstophosphoric acid have been developed and widely known. However, inorganic materials have drawbacks of 1) large specific gravity, 2) difficult in formation into a desired shape, 3) impossibility of obtaining soft and thin film, and 4) low ion conductivity at room temperature, which cause problems in practical use.

Recently, organic materials have become of interest as potential material that can mitigate the above-described drawbacks. Such polymer solid electrolyte is manufactured in a manner such that electrolyte (mainly organic salt), such as $LiClO_4$ or $LiBF_4$—which serves as a carrier—is mixed and dissolved into a matrix polymer such as polyalkylene oxide, silicone rubber, fluororesin, or polyphosphazen. Such polymer solid electrolyte is lighter and more flexible than inorganic materials, and therefore can be easily machined or formed into film. Under such circumstance, active research and development have been conducted in recent years in order to obtain a polymer solid electrolyte that exhibits higher ionic conductivity while maintaining the above-described characters.

A presently known most effective method of imparting high ion conductivity is a technique in which aprotic organic electrolytic solution is absorbed into a polymer solid electrolyte in any manner in order to obtain solid electrolyte in the form of gel (see M. Armand, Solid States Ionics, 69, pp. 309–319 (1994)). Polymers that are usable as a matrix in the gel-type solid electrolyte are generally divided into 1) linear polymers such as polyether polymers and fluororesins, and 2) cross-linked polymers such as polyacrylic polymers.

Applications of the above-described linear polymers are shown in, for example, I. E. Kelly et al., J. Power Sources, 14, pp. 13 (1985) and U.S. Pat. No. 5,296,318. However, both cases have the problems of leakage of electrolytic solution from polymer and insufficient strength of film. Further, since electrolytic solution acts as a plasticizer for polymer serving as a matrix, the polymer itself dissolves into the electrolytic solution even when the temperature of the system increases slightly.

For the cross-linked polymers, there have proved a method in which a liquid monomer mixed with an electrolytic solution is polymerized to yield a cross-linked polymer including an electrolyte (see PCT/JP91/00362, International Laid-Open No. WO91/14294). However, in this method, when the crosslinking degree of the polymer is increased, the ion conductivity decreases considerably, and when the crosslinking degree is decreased, the solid strength (elastic modulus) of the polymer decreases, so that film having a sufficient strength cannot be obtained.

In Japanese Patent No. 1842047 (Invention A), the applicant of the present invention proposed a block-graft copolymer, which is a model of the present invention and the method therefor. Also, in Japanese Patent No. 1842048 (Invention B), the applicant of the present invention proposed a polymer solid electrolyte composed of a block-graft copolymer composition in which in order to increase the ion conductivity of the block-graft copolymer, there is mixed an inorganic salt containing at least one element selected from the group consisting of Li, Na, K, Cs, Ag, Cu, and Mg in an amount of 0.05–80 mol % with respect to the alkylene oxide side unit thereof.

In Japanese Patent Publication (kokoku) No. 5-74195 (Invention C), the applicant of the present invention proposed a Li cell which includes, as an electrolyte, a composite material composed of a Li ion salt and a block-graft copolymer similar to the above. Further, In Japanese Patent Application Laid-Open (kokai) No. 3-188151 (Invention D), the applicant of the present invention proposed a block-graft copolymer composition which is obtained by adding polyalkylene oxide to the above-described inorganic ion salt composite of a block-graft copolymer.

In the inventions B, C, and D, an organic solvent is added, together with an inorganic salt or the like, to a resultant block-graft copolymer in order to dissolve it, and after formation, the organic solvent is removed through drying in order to yield a polymer solid electrolyte. However, since all the polymer solid electrolytes is slightly low in terms of ion conductivity, they have not come into practical use.

In order to improve the ion conductivity, in Japanese Patent Application Laid-Open (kokai) No. 7-109321, the applicant of the present invention has proposed a composite solid electrolyte in which a nonaqueous electrolyte including a cyclic carbonate solvent and an inorganic salt is included in the same block-graft copolymer as that described above. Although the invention improved the ion conductivity, and at the same time increased the film strength drastically, it was found that if such a composite solid electrolyte is applied to household small cells in which characteristics at low temperatures (room temperature to −20° C.) are regarded as important, satisfactory lower temperature characteristics are difficult to be obtained because of the high viscosity and the high melting point of the cyclic carboxylic acid ester. This problem necessitates adding, as a secondary component, a large amount of a low boiling-point linear ester or a carbonic acid ester, which is a generally known method for improving the low-temperature characteristics of cells. However, since these solvents are good solvents for the above-described block-graft copolymer, addition of a large amount of such a solvent causes dissolving of the polymer solid electrolyte itself.

Further, when the above-described composite solid electrolyte is applied to large-sized cells for use in electric vehicles and electrical power leveling systems and the like for operation at high temperatures (60–80° C.), which cells are expected to come into practical use in the future, polyalkylene oxide having low vapor pressure is optimally used as a main component. However, even in this case, use of a large amount of polyalkylene oxide causes swelling and dissolving of the polymer solid electrolyte.

Meanwhile, electrochemical elements represented by cells have employed liquid electrolytes. Particularly, in recent years, electrochemical elements employing solid electrolytes free from the problem of liquid leakage have been intensively developed in view of safety. Among these electrochemical elements, those employing polymer solid electrolytes (hereinafter abbreviated as SPE) are expected to be developed. Since SPE is flexible as compared with inorganic solid electrolytes and enable free design of the shape of elements employing the same, there is particularly expected the development of new type cells having a reduced thickness, high energy density, and shape-related merits, which features are implemented by use of SPE and, as a negative electrode, a lithium metal or a carbon material or the like which occludes lithium.

The new type cells are expected to be applied to consumers' products such as cellular phones, notebook type personal computers, video recorders, other portable electronic devices, and power sources for IC cards. Also, in view of safety, large-sized lithium batteries employing SPE are highly expected to be used in electronic automobiles and load leveling equipment (Nature, 373, pp. 557–558 (1995)). Examples of SPE systems which have been studied include polyethylene oxide (PEO)-Li salts. Intensive studies have been carried out in an attempt to obtain block copolymers containing ethylene oxide (EO) from SPE systems serving as starting systems and to obtain EO-grafted polymers.

However, the ionic conductivity of these homopolymer electrolytes is insufficient, specifically not greater than $10^{-4}$ S/cm at room temperature, which is two orders of magnitude lower than that of electrolytic solutions used in currently commercialized lithium cells. Further, due to a large interfacial resistance present in the solid-solid interface between an electrolyte and an electrode, the internal resistance of an entire cell system becomes very large. Accordingly, application of SPE to solid cells has been impossible. To improve the ionic conductivity of SPE, there has been made an active attempt to obtain a gel electrolyte by curing an optically hardening monomer, an electron beam hardening monomer, or a thermosetting monomer, together with an organic electrolyte. As a result, an ionic conductivity of approximately $10^{-3}$ S/cm (at room temperature) has been attained. However, the strength of an electrolyte membrane is weak as compared with that of a conventional polymer electrolyte. Thus, cells employing the gel SPE have involved unstable cell characteristics due to the occurrence of an internal short circuit during the manufacture thereof.

Several attempts have been made to combine an electrically insulating material and an SPE component into a composite for the purpose of improving the membrane strength of the above-mentioned gel SPE. According to U.S. Pat. Nos. 5,102,752 and 5,378,558, a nonwoven fabric-SPE composite is obtained by impregnating a nonwoven aramid fabric with a solution obtained by dissolving a gel electrolyte component, and cooling the fabric or ultraviolet-curing the electrolyte through use of an epoxy cross-linking agent. According to Japanese Patent Application Laid-Open (kokai) No. 5-205515, a separator-SPE composite is obtained by dropping a gel electrolyte solution onto a conventional separator for lithium cell use and then ultraviolet-cross-linking the separator. Also, a similar fabrication of a nonwoven fabric-SPE composite is reported in the 8th International Meeting on Lithium Batteries, Extended Abstracts, pp. 284–285 (1996). Further, a similar fabrication of a separator-gel SPE composite is reported in J. Electrochem. Soc., 142, pp. 683–687 (1995).

According to Japanese Patent Application Laid-Open (kokai) No. 5-217416, a porous film-SPE composite is obtained by impregnating a porous film similar to a separator with a gel electrolyte solution, adding a polymerization initiator to the film, and thermosetting the film. According to Japanese Patent Application Laid-Open (kokai) No. 7-272759, a porous film-SPE composite is fabricated by subjecting a separator to corona discharge treatment, applying a polyvinyl carbonate solution onto the separator, and evaporating the solvent. However, the above-described conventional techniques involve the problems described below and thus are not put into practical use.

According to U.S. Pat. Nos. 5,102,752 and 5,378,558 mentioned previously, an electrolyte component is dissolved at 70° C. to become an electrolyte solution, with which a nonwoven fabric is impregnated to become a composite electrolyte. However, upon being stored for a long period of time at a temperature of not less than 70° C., the composite electrolyte involves the problem that the electrolyte may ooze; that is, the high-temperature characteristics of the composite electrolyte involve a problem. Also, according to Japanese Patent Application Laid-Open (kokai) No. 5-205515 mentioned previously, a polymerization initiator is used to combine a separator and an SPE component into a separator-SPE composite. However, this technique involves the fear that residual polymerization initiator may affect the storability of cells employing the separator-SPE composite.

According to J. Electrochem. Soc., 142, pp. 683–687 (1995); the 8th International Meeting on Lithium Batteries, Extended Abstracts, pp. 284–285 (1996); and Japanese Patent Application Laid-Open (kokai) No. 5-217416, all mentioned previously, an SPE component indispensably contains an acrylic monomer and is used with a polymerization initiator. However, it is pointed out that an ester linkage included in the acrylic monomer and residual polymerization initiator are electrochemically unstable. Also, according to Japanese Patent Application Laid-Open (kokai) No. 7-272759 mentioned previously, in order to fabricate a uniform SPE-separator composite, a separator previously undergoes corona discharge treatment and is then combined with a polyvinylene SPE. However, this technique involves the problem that the internal resistance of a cell employing the SPE-separator composite becomes high due to a thick membrane having a thickness of not less than 100 μm.

As mentioned previously, the electric conductivity of a gel SPE is one order of magnitude lower than that of a liquid electrolyte. Also, in view of the interfacial resistance present in the interface between SPE and an electrode, the electric conductivity of a gel SPE is two orders of magnitude lower than that of a liquid electrolyte. Accordingly, the absolute resistance of SPE must be reduced by reducing the thickness of an SPE membrane, specifically to not greater than 25 μm, which is equivalent to the thickness of separators currently used in lithium cells. Thus, an SPE membrane having a thickness of not less than 100 μm has too high an absolute resistance to be put into practical use. Also, the above-described conventional techniques involve a drawback of insufficient adhesion between an electrically insulating material and a polymer component, since the electrically insulating material is generally composed of hydrophobic components having low polarity. As a result, the state of polymers contained in the obtained composite solid electrolyte becomes nonuniform, and a potential release of a polymer component is involved, resulting in a failure to obtain good electrolyte characteristics.

SUMMARY OF THE INVENTION

In view of the foregoing, an object of the present invention is to provide a method of manufacturing a cross-linked polymer solid electrolyte which does not become swollen or dissolved by any kind of electrolytic solution, which allows manufacture of cells for various kinds of applications through change of the electrolytic solution, which exhibits excellent performance in holding the electrolytic solution and has increased mechanical strength, and which has high ion conductivity and improved formability.

Another object of the present invention is to provide a cross-linked polymer solid electrolyte manufactured by the above method.

Still another object of the present invention is to provide a thin composite solid electrolyte which has an improved membrane strength, is easy to handle, and has polymer components distributed uniformly therein, and particularly to provide a thin solid cell employing the composite solid electrolyte and having stable cell characteristics.

To achieve the above object, according to a first aspect of the present invention, there is provided a method of manufacturing a cross-linked polymer solid electrolyte. In the method, there is first provided a block-graft copolymer X composed of a polymer block chain A and a polymer block chain B at a component ratio of 1:30 to 30:1 and having a degree of polymerization of not less than 310, the polymer block chain A having a recurrent structure unit as represented by formula I below and a degree of polymerization of not less than 10

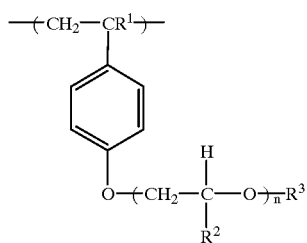

I (wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and a graft chain as represented below has a number average molecular weight of 45 to 4400),

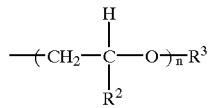

the polymer block chain B having a recurrent structure unit as represented by formula II below and a degree of polymerization of not less than 300

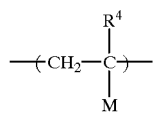

II (wherein $R^4$ represents a hydrogen atom, a methyl group, or an ethyl group; M represents a group represented by $-CH=CH_2$, $-C(CH_3)=CH_2$, $-COOCH_3$, or $-COOC_2H_5$, a phenyl group, or a substituted phenyl group). A crosslinking agent is then added to a material block-graft copolymer X; a high energy ray is irradiated to the block-graft polymer in order to crosslink the entire system, and an nonaqueous electrolytic solution is added to the block-graft polymer.

Since a crosslinking agent is added to a block-graft copolymer X and a high-energy ray is irradiated onto the copolymer to cause crosslinking throughout the copolymer, backbone molecules form a pseudo-cross-linked structure, thereby enhancing the mechanical strength of the film, while the graft component forms a continuous phase in order to secure passages for metal ions and serves as a compatibilizer for stably holding the electrolytic solution.

Preferably, the above-described crosslinking reaction utilizes a crosslinking agent containing a vinyl monomer having two or more functional groups and optionally containing a vinyl monomer having a single functional group. When an electron ray, an ultraviolet ray, or a heat ray is used as the high energy ray, crosslinking can be performed completely.

The above-described nonaqueous electrolytic solution may be composed of polyalkylene oxide and a lithium inorganic salt. Alternatively, the above-described nonaqueous electrolytic solution may be composed of a lithium inorganic salt and an ester selected from the group consisting of high-boiling-point cyclic carbonic acid esters, low-boiling-point linear esters, and carbonic acid esters.

The above-described manufacturing method enables simple and reliable manufacture of a cross-linked polymer solid electrolyte which causes neither deterioration in mechanical strength nor leakage of the electrolytic solution even at high and low temperatures.

When a cross-linked polymer solid electrolyte is manufactured by the above-described method, the cross-linked polymer solid electrolyte does not cause leakage of electrolytic solution at low or high temperature and has an increased ion conductivity.

In the cross-linked polymer solid electrolyte of the present invention, the block-graft copolymer, which is a constituent element thereof, has the following characteristics:

1) The block-graft copolymer exhibits a clear micro phase separation structure;

2) The backbone molecules having a large mechanical strength forms pseudo cross-linked structure, which serves to hold the structure and increase the strength of the material;

3) Even when the graft component has a relatively low molecular weight, a continuous phase is formed and passages for metal ions are secured;

4) Since the graft component serves as a compatibilizer, a large amount of an electrolytic solution can be held stably within a film; and 5) A cell for each intended application can be easily manufacture by merely changing the composition of the electrolytic solution.

Accordingly, when a cross-linked polymer solid electrolyte obtained through addition of an electrolytic solution composed of polyalkylene oxide and a lithium inorganic salt to a cross-linked block-graft copolymer of the present invention is applied to lithium-ion secondary cells that operate at high temperatures and are suitable for electrical power leveling systems and the like or electric vehicles, the size, especially thickness, of the cells can be effectively reduced, and considerably safe cells can be manufactured. Further, a film-shaped cross-linked polymer solid electrolyte of the present invention obtained through addition of a nonaqueous electrolytic solution composed of a low-boiling-point organic solvent and a lithium inorganic salt to a cross-linked block-graft copolymer has excellent low-temperature characteristics, does not cause leakage of the electrolytic solution, and has excellent mechanical strength. Therefore, the film-shaped cross-linked polymer solid electrolyte of the present invention is suitable for household small-sized cells.

According to a second aspect of the present invention, there is provided a composite solid electrolyte for use in a solid electrochemical element, comprising:

a) an electrically insulating material;
b) an alkali metal salt;
c) a block-graft copolymer X defined above; and
d) an aprotic organic solvent.

Through employment of the above structure, the composite solid electrolyte has an improved membrane strength, is easy to handle, and has polymer components distributed uniformly therein.

Preferably, the electrically insulating material is an electrically non-conductive porous membrane, nonwoven fabric, or mesh-like woven fabric. Also, preferably, the aprotic organic solvent is selected singly or in combination from the group consisting of γ-butyrolactone, ethylene carbonate, propylene carbonate, butylene carbonate, 2-methyl-γ-butyrolactone, dimethyl sulfoxide, sulfolane, and 2-methylsulfolane.

Through formation from the thus-selected materials, the composite solid electrolyte, even in the form of a thin membrane, has a sufficiently large mechanical strength, low absolute resistance, and high ionic conductivity.

According to the second aspect of the present invention, there is further provided a thin solid cell (secondary cell), a primary cell, a capacitor, an electrochromic display, or a sensor fabricated through use of the composite solid electrolyte. Thus, these solid electrochemical elements can be reduced in size and thickness and improved in electrical characteristics.

According to the second aspect of the present invention, there is further provided a thin solid cell comprising the composite solid electrolyte, a positive electrode, and a negative electrode, wherein the positive electrode comprises a solid electrolyte, which in turn comprises at least the block-graft copolymer and the alkali metal salt, and the active material of the positive electrode, and wherein the negative electrode comprises a solid electrolyte, which in turn comprises at least the block-graft copolymer and the alkali metal salt, and the active material of the negative electrode.

By employing the structure that the positive electrode employing the solid electrolyte, the negative electrode employing the solid electrolyte, and the composite solid electrolyte are arranged in layers, the thin solid cell exhibits excellent mechanical strength, low internal resistance, and electrochemically stable cell characteristics.

The composite solid electrolyte of the present invention employs, as a polymer component, a block-graft copolymer wherein a graft chain portion and a backbone molecule portion show a micro layer separation structure. Thus, the graft chain portion forms a layer for diffusing ions and can hold a large amount of the aprotic solvent. Accordingly, the obtained composite solid electrolyte exhibits high ionic conductivity. Also, since a porous membrane formed from electrically insulating plastic is used to mechanically support the polymer component, even a thin electrolyte membrane has a sufficiently large mechanical strength and sufficient self supportability. Accordingly, the obtained composite solid electrolyte has low absolute resistance.

Also, a polymer used in the composite solid electrolyte of the present invention contains a phenyl group in the backbone molecule thereof and thus has higher adhesion to the porous membrane formed from electrically insulating plastic as compared with a conventional electrolyte polymer. Accordingly, even when a thin solid cell is manufactured through use of the composite solid electrolyte, the cell is free from an increase and variation in the internal resistance thereof which would otherwise be caused by separation of a polymer.

Further, the polymer used in the composite solid electrolyte of the present invention does not contain an acrylic group in contrast with a conventional polymer electrolyte and thus enables the electrolyte to be electrochemically stable. Accordingly, the thin solid cell of the present invention employing the composite solid electrolyte exhibits stable cell characteristics.

DESCRIPTION OF INVENTION, PREFERRED EMBODIMENTS, AND EXAMPLES

Next, the present invention will be described in further detail. However, the present invention is not limited thereto. The first aspect of the present invention, embodiments and examples thereof:

The inventors of the present invention found that crosslinking a block-graft copolymer into a three-dimensional network structure is effective for obtaining a polymer solid electrolyte which makes the best use of the characteristics of the block-graft copolymer, which has excellent mechanical strength and solution holding capability, and which does not cause deterioration of cell characteristics at any temperature ranging from low to high temperature. The present invention was made based this finding.

A block-graft copolymer X, which is a material for a cross-linked polymer serving as a constituent element of the cross-linked polymer solid electrolyte, is basically the same as that disclosed in the above-described Japanese Patent 1842047. For convenience, a description will be given again.

The block-graft copolymer X used in the composite solid electrolyte of the present invention is composed of a polymer block chain A and a polymer block chain B at a component ratio of 1:30 to 30:1 and has a degree of polymerization of not less than 310. The polymer block chain A has a recurrent structure unit as represented by formula I below and a degree of polymerization of not less than 10.

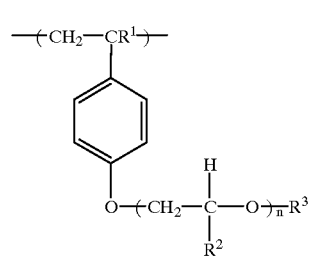

I (wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and a graft chain as represented below has a number average molecular weight of 45 to 4400)

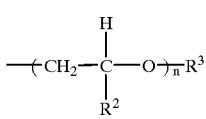

The polymer block chain B has a recurrent structure unit as represented by formula II below and a degree of polymerization of not less than 300.

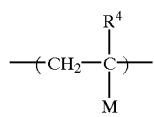

(wherein $R^4$ represents a hydrogen atom, a methyl group, or an ethyl group; M represents a group represented by $-CH=CH_2$, $-C(CH_3)=CH_2$, $-COOCH_3$, or $-COOC_2H_5$, a phenyl group, or a substituted phenyl group)

In the block-graft copolymer, the polymer block chains A and B having same or different recurrent structure units represented by formulas I and II, respectively, are configured in any arrangement, such as AB, BAB, BAB', or BAB'AB. The polymer block chain A has a degree of polymerization of not less than 10, and the polymer block chain B has a degree of polymerization of not less than 300. The block-graft copolymer X is composed of the polymer block chains A and B at a component ratio of 1:30 to 30:1 and has a degree of polymerization of not less than 310.

The polymer block chain A implements the function of a polymer electrolyte. If the degree of polymerization of the polymer block chain A is less than 10, there is not attained the expected micro phase separation structure that ionic conducting domains are arranged in continuous phase. The polymer block chain B functions to sustain mechanical strength. Accordingly, if the degree of polymerization of the polymer block chain B is less than 300, the mutual linkage of the block chains B will become insufficient, causing a reduction in the mechanical strength of a polymer membrane. Likewise, if the component ratio between the polymer block chain A and the polymer block chain B is less than 1:30, the content of a graft component will become too low to sustain the function of a polymer electrolyte. By contrast, if the component ratio is in excess of 30:1, the content of a backbone molecule component will become too low to sustain a required mechanical strength.

Next, a description will be given of a method in which the above-described block-graft copolymer X is cross-linked to yield a cross-linked polymer, to which an electrolytic solution is added to complete a cross-linked polymer solid electrolyte.

The crosslinking of the block-graft copolymer X is completed through addition of a crosslinking agent and radiation of a high energy ray.

As the crosslinking agent, there is used a vinyl monomer having two or more functional groups, which preferably contains no active hydrogen, halogen, or the like in the structure thereof. Specific examples of the vinyl monomer having two or more functional groups include divinylbenzene, 1,3,5-benzenetriallylcarboxylate, trimethylpropanetriacrylate, trimethylolpropanetrimethacrylate, and 2,2-paracyclophane. Also, addition of a mono-functional vinyl monomer is effective in increasing the distance between the cross-linked points.

The crosslinking agent is added to the block-graft copolymer X in an amount of 5–100 wt. % based on the amount of the block-graft copolymer X. If the amount of the crosslinking agent is less than 5 wt. %, the degree of crosslinking does not increase. If the amount of the crosslinking agent is in excess of 100 wt. %, the crosslinking agent adversely affects the quality of the cross-linked polymer. Further, the monofunctional vinyl monomer was effective when it was added to the block-graft copolymer X in an amount of 5–50 wt. % based on the amount of the crosslinking agent.

Examples of means for exciting the crosslinking reaction include an electron beam (radioactive ray), an ultraviolet ray (light), and a heat ray. The energy level falls within the range of $10^3$–$10^6$ eV for the electron beam, on the order of a few eV for the ultraviolet ray, and within the range of 0–$10^{-2}$ for the heat ray. Although any of these methods can be selectively used as the crosslinking reaction exciting means, in the present invention crosslinking through use of an electron beam is preferably used, because the electron beam has a high energy level, can be controlled easily, and does not require a radical-generation agent. When an electron beam radiation apparatus CB250/30/180L (trade name, product of Iwasaki Electric Co. Ltd.) was used, an effective result was obtained at an acceleration voltage of 200 kV and a dose of 10–50 Mrad.

Crosslinking through use of a heat ray is not suitable for carrying out a wide range of crosslinking with high reproducibility. Although crosslinking through use of an ultraviolet ray is a convenient method, crosslinking cannot be performed well in some cases, depending on the shape of film. In crosslinking through use of a heat ray and an ultraviolet ray in combination, a radical-generation agent for exciting the crosslinking agent is required. However, use of the radical-generation agent makes the reaction system complicated, and transportation of lithium ions adversely affected in some cases.

Next, description will be given of electrolytic solutions having characteristics directed to their respective applications, and a method of manufacturing a cross-linked polymer solid electrolyte.

[Electrolytic solution for large-sized cells operating at high temperatures (60–80° C.)]

It was found that an electrolytic solution optimal for large-sized cells for use in electric vehicles and electrical power leveling systems and the like for operation at high temperatures (60–80° C.) preferably includes, as a main component, polyalkylene oxide, which has high heat stability and generates low vapor pressure at high temperature. It was also found that such electrolytic solution is suitable to the cross-linked block-graft copolymer of the present invention.

Examples of the polyalkylene oxide to be added to the cross-linked block-graft copolymer include diethylene glycol, triethylene glycol, tetraethylene glycol, polyethylene glycol, diethylene glycol monomethyl ether, polyethylene glycol monoethyl ether, polyethylene glycol monopropyl ether, diethylene glycol dimethyl ether, polyethylene glycol dimethyl ether, polyethylene glycol diethyl ether, polyethylene glycol dipropyl ether, and compounds obtained by replacing the ethylene glycol structure with a propylene glycol structure. These compounds are used singly or in combination of two or more.

Examples of the lithium inorganic salt to be added to the polyalkylene oxide include $LiClO_4$, $LiCF_3SO_3$, $LiBF_4$, $LiPF_6$, $LiAsF_6$, and $LiN(CF_3SO_2)_2$. At least one of these salts is preferably used. The concentration of the salt is preferably 0.5–3 mols/liter. If the concentration is not greater than 0.5 mols/liter, the number of ion carriers within an electrode decreases, resulting in a decrease in the coefficient of use. The salt is preferably added in an amount of 20 wt. % or more, more preferably 100–300 wt. %, with respect to the amount of the block-graft copolymer.

[Nonaqueous electrolytic solution suitable for household small-sized cells whose characteristics at low temperatures (room temperature to −20° C.) are important]

A polymer solid electrolyte suitable for household small-sized cells used in cameras, video cameras, and the like is required to maintain ion conductivity even at low temperatures (room temperature to −20° C.). In order to satisfy the requirement, in the present invention, in addition to a cyclic carbonic acid ester having a high viscosity, a linear ester or a linear carbonic acid ester having a low viscosity and a high dielectric constant is added to a nonaqueous electrolytic solution in order to reduce the viscosity of the overall nonaqueous electrolytic solution.

The nonaqueous electrolytic solution to be added to the above-described cross-linked block-graft copolymer is composed of a lithium inorganic salt and an ester selected from the group consisting of high-boiling-point cyclic carbonic acid esters, low-boiling-point linear esters, and low-boiling point carbonic acid esters. Specific examples of the high-boiling-point cyclic carbonic acid esters include ethylene carbonate, propylene carbonate, γ-butyrolactone, and 2-methyl-γ-butyrolactone. Specific examples of low-boiling-point linear esters and carbonic acid esters include 1,2-dimethoxyethane, methoxyethoxyethane, dioxolan, 4-methyldioxolan, 2-methyldioxolan, diethylcarbonate, acetonitrile, tetrahydrofuran, and 2-methyltetrahydrofuran. At least one of the above-described high-boiling-point cyclic carbonic acid esters is mixed with at least one of the above-described low-boiling-point linear esters and carbonic acid esters at a ratio (volume ratio) of 20:80 to 80:20.

Examples of the lithium inorganic salt are the same as those described above. The concentration of the salt is preferably 0.5–3 mols/liter. If the concentration is not greater than 0.5 mols/liter, the number of ion carriers within an electrode decreases, resulting in a decrease in the coefficient of use. The salt is preferably added in an amount of 20 wt. % or more, more preferably 100–300 wt. %, with respect to the amount of the block-graft copolymer.

No limitation is imposed on a method of mixing the nonaqueous electrolytic solution into the above-described cross-linked block-graft copolymer. For example, there may be used a method in which the nonaqueous electrolytic solution is added to the cross-linked block-graft copolymer, which is then kneaded mechanically at room temperature or with heat, or a method in which the nonaqueous electrolytic solution and the cross-linked block-graft copolymer are dissolved into a solvent common to both and then formed into film, and the thus-obtained film is immersed into the nonaqueous electrolytic solution. Especially, in the latter method, since the saturation amounts of the polyalkylene oxide and the aqueous electrolytic solution within the cross-linked block-graft copolymer are univocally determined depending on the composition of the graft chain, adjustment of film-shaped sold electrolyte is easily and highly reproducible.

The first aspect of the present invention will next be described by way of example, which should not be construed as limiting the invention.

In the examples, each block copolymer is represented by connecting the respective components with "-b-." For example, a three-component-system block copolymer composed of polystyrene, poly-p-hydroxystyrene, and polystyrene is represented as poly(sthyrene-b-p-hydroxystyrene-b-styrene). A graft chain is represented by "-g-."

EXAMPLE 1

(Electron beam crosslinking of a block-graft copolymer):

A block-graft copolymer (6.0 g) "poly[styrene-b-(p-hydroxystyrene-g-ethylene oxide)-b-styrene] (composition ratio of the graft chain: 57.4%, the length of the graft chain: 700, the degree of polymerization (n) of the graft chain: 16, the number-average molecular weight of the graft chain: $17.5 \times 10^4$, the number-average molecular weight of the copolymer: $30.5 \times 10^4$)" and 0.9 g of divinyl benzene were dissolved into 120 ml of tetrahydrofuran (THF), and the resultant mixture was placed and spread on a Teflon plate to obtain a sample. The sample was allowed to stand at room temperature for 24 hours in a stream of argon in order to remove the excess portion of the solvent. Subsequently, the sample was dried at room temperature for 1 hour under reduced pressure to yield a film having a thickness of 100 μm. An electron beam was irradiated onto the film at an acceleration voltage of 200 kV and a dose of 10 Mrad. for crosslinking, and the film was immersed into 100 ml of THF in order to evaluate the degree of crosslinking. The result showed that the shape of the film changed little although the thickness of the film increased by approximately 20% to 120 μm.

EXAMPLES 2–10

The same block-graft copolymer as that used in Example 1 was cross-linked under the crosslinking conditions shown in Table 1 and the degree of crosslinking was evaluated. The measured degrees of crosslinking are shown in Table 1.

From the results, it was found that when the dose of the electron beam is not less than 10 Mrad., the block-graft copolymer becomes insoluble against THF independent of a type of crosslinking agent. Among the crosslinking conditions of Examples 2–10, the crosslinking conditions of Example 4 were used as basic conditions for manufacture of a polymer solid electrolyte, because the system used in Example 4 was simplest and the amount of crosslinking agent used in Example 4 was small.

TABLE 1

| | Composition | | | Radiation of electron beam | | |
|---|---|---|---|---|---|---|
| | Block-graft copolymer (g) | Amount of crosslinking agent (g) | Type of crosslinking agent (*) | Beam current (mA) | Dose (Mrad.) | Solubility against THF solvent |
| Example 2 | 5.0 | 1.0 | DB | 10 | 3 | Swelling, partially dissolved |
| Example 3 | 5.0 | 1.0 | DB | 10 | 12 | Not dissolved |
| Example 4 | 1.0 | 0.1 | DB | 10 | 25 | Not dissolved |
| Example 5 | 1.2 | 1.2 | DB | 25 | 50 | Not dissolved |
| Example 6 | 1.2 | 0.24 0.24 | DB St | 10 | 10 | Not dissolved |

TABLE 1-continued

| | Composition | | | Radiation of electron beam | | |
|---|---|---|---|---|---|---|
| | Block-graft copolymer (g) | Amount of crosslinking agent (g) | Type of crosslinking agent (*) | Beam current (mA) | Dose (Mrad.) | Solubility against THF solvent |
| Example 7 | 1.2 | 0.48<br>0.24 | DB<br>St | 12.5 | 25 | Not dissolved |
| Example 8 | 2.0 | 0.2 | BPTM | 10 | 15 | Not dissolved |
| Example 9 | 2.0 | 0.2 | TMPT | 10 | 20 | Not dissolved |
| Example 10 | 1.5 | 0.5<br>0.5 | TMRO<br>PAC | 25 | 50 | Not dissolved |

(*) DB: divinyl benzene,
St: stylene,
BPTM: 1,3,5-benzene triallylcarboxylate,
TMPT: trimethylpropanetriacrylate,
TMRO: trimethylolpropanetrimethacrylate,
PAC: 2,2-paracyclophane

EXAMPLE 11
(Polymer solid electrolyte for high temperature cells):

The same block-graft copolymer (5.0 g) used in Example 1 (composition ratio of the graft chain: 57.4%, the length of the graft chain: 700, the degree of polymerization (n) of the graft chain: 16, the number-average molecular weight of the graft chain: $17.5 \times 10^4$, the number-average molecular weight of the copolymer: $30.5 \times 10^4$)" and 0.5 g of divinyl benzene were dissolved into 120 ml of 1,4-dioxane, and the resultant mixture was placed and spread on a Teflon plate to obtain a sample. The sample was allowed to stand at room temperature for 24 hours in a stream of argon in order to remove the excess portion of the solvent. Subsequently, the sample was dried at room temperature for 1 hour under reduced pressure to yield a film having a thickness of 100 μm. An electron beam was irradiated onto the film at an acceleration voltage of 200 kV and a dose of 25 Mrad. for crosslinking, and for 20 hours the film was immersed into an electrolytic solution which was prepared by dissolving $LiAsF_6$ into polyethylene glycol dimethylether (Mn=350) at a concentration of 1.2 mols/liter. The results showed that the shape of the film changed little although the thickness of the film increased by approximately 10% to 110 μm.

The thus-obtained cross-linked polymer solid electrolyte film was strong even though the film contained the electrolytic solution in an amount of 120% based on the amount of the cross-linked block-graft copolymer. The elastic modulus of the film as measured by a dynamic viscoelasticity tester RSA-II (trade name, product of Reometric Inc.) was $1.4 \times 10^{-6}$ dyne/cm² or more. Also, even when the electrolyte film was compressed under a load of 50 kg/cm², the electrolytic solution contained therein did not exude.

The film was cut into a circular sheet having a diameter of 10 mm, and the circular sheet was sandwiched between two lithium electrode plates. In order to measure the impedance of the film, these electrode plates were connected to an AC impedance measurement apparatus for the frequency range of 5 Hz to 5 MHz (Multi-frequency LCRX meter, model 4192A (trade name, product of Yokogawa-Hewlett-Packard, Ltd.). In accordance with a complex impedance method, the ion conductivity of the film was calculated. The calculation results showed that the ion conductivity was $0.9 \times 10^{-3}$ S/cm at 80° C.

The results of a thermal analysis performed through use of a differential thermal balance DSC-20 (trade name, product of Seiko Instruments, Inc.) showed that the weight of the film does not decrease at temperatures up to 170° C. and therefore exhibits very high thermal stability. Also, since no volatile component is generated even at high temperatures, the polymer solid electrolyte is a polymer solid electrolyte having a very high degree of safety and suitable for use in high temperature cells.

EXAMPLES 12–16

An electrolytic solution composed of a different kind of polyalkylene oxide and a lithium inorganic salt was added to the cross-linked block-graft copolymer prepared under the conditions used in Example 4 so as to manufacture a cross-linked polymer solid electrolyte. The thus-manufactured solid electrolyte was evaluated in the same manner as in Examples 11. The evaluation results are shown in Table 2.

TABLE 2

| | Type and amount of polyalkylene oxide and lithium inorganic salt | | | | | | | |
|---|---|---|---|---|---|---|---|---|
| | | | | Lithium inorganic salt | | Addition | Elastic | | Ion |
| | Polyalkylene oxide | (vol. %) | Type | Concentration (*) | amount (wt. %) | modulus () | Elongation (%) | conductivity (*) |
| Example 12 | Polyethylene glycol dimethyl ether, Mn 350 | | $LiClO_4$ | 1.0 | 130 | 1.9 | 70 | 1.0 |
| Example 13 | Polyethylene glycol dimethyl ether, Mn 500 | | $LiPF_6$ | 1.0 | 110 | 3.0 | 80 | 0.3 |

TABLE 2-continued

| | Type and amount of polyalkylene oxide and lithium inorganic salt | | | | | | | |
|---|---|---|---|---|---|---|---|---|
| | | | | Lithium inorganic salt | | Addition | Elastic | | Ion |
| | Polyalkylene oxide | (vol. %) | Type | Concentration (*) | amount (wt. %) | modulus () | Elongation (%) | conductivity (*) |
| Example 14 | Polyethylene glycol, Mn 200 | | $LiBF_4$ | 1.0 | 150 | 1.0 | 40 | 3.0 |
| Example 15 | Polyethylene glycol, Mn 1000 | | $LiPF_6$ | 1.5 | 90 | 4.3 | 40 | 0.1 |
| Example 16 | Polyethylene glycol dimethyl ether, Mn 350 | (80) | | | | | | |
| | Diethylene glycol dimethyl ether | (20) | $LiPF_6$ | 0.8 | 160 | 1.7 | 30 | 1.8 |

*: (mol/liter),
**: ($10^{-6}$ dyne/cm$^2$),
***: (80° C., $10^{-3}$ S/cm)

From the evaluation results, it was found that the cross-linked polymer solid electrolyte manufactured according to the present invention has high film strength and high ion conductivity even though the electrolyte contains a large amount of an electrolytic solution composed of a polyalkylene oxide and a lithium inorganic salt.

EXAMPLES 17–24

(cross-linked polymer solid electrolyte for small-sized cells whose low-temperature characteristics are regarded as important):

A nonaqueous electrolytic solution composed of a different kind of organic solvent and a lithium inorganic salt was added to the cross-linked block-graft copolymer prepared under the conditions used in Example 4 so as to manufacture a cross-linked polymer solid electrolyte having excellent low-temperature characteristics. The thus-manufactured solid electrolyte was evaluated in the same manner as in Example 11. The evaluation results are shown in Table 3.

the present invention exhibits excellent ion conductivity even at low temperatures and has a high film strength.

COMPARATIVE EXAMPLE 1

A film-shaped solid electrolyte having a thickness of 100 μm was manufactured in accordance with the method of forming a polymer solid electrolyte described in U.S. Pat. No. 5,296,318. Kyner FLEX2801 (trade name, polymer product of Atochem Corp.)(1.5 g) and 1 mol/liter of $LiPF_6$ in propylene carbonate (1.5 g) were dissolved into THF (9 g) and mixed. The mixture was then cast on a Teflon Petri dish and allowed to stand at room temperature for 10 hours in order to yield a film having a thickness of 100 μm. When approximately 12 hours elapsed after the film was left on a glass plate, propylene carbonate of the electrolytic solution flowed out of the film.

COMPARATIVE EXAMPLE 2

A film-shaped solid electrolyte having a thickness of 100 μm was manufactured from a polymer described in Japanese

TABLE 3

| | Type and amount of nonaqueous electrolytic solution | | | | | | | |
|---|---|---|---|---|---|---|---|---|
| | | | | Lithium inorganic salt | | Addition | Elastic | | Ion |
| | Organic solvent | (vol. %) | Type | Concentration (*) | amount (wt. %) | modulus () | Elongation (%) | conductivity (*) |
| Example 17 | γ-Butyrolactone | (80) | $LiClO_4$ | 1.0 | 250 | 4.5 | 40 | 1.2 |
| | Diethyl carbonate | (20) | | | | | | |
| Example 18 | Ethylene carbonate | (50) | $LiPF_6$ | 1.3 | 280 | 3.2 | 30 | 1.5 |
| | Tetrahydrofuran | (50) | | | | | | |
| Example 19 | Propylen carbonate | (40) | $LiAsF_6$ | 0.5 | 290 | 1.9 | 30 | 1.6 |
| | Methoxyethoxyethane | (60) | | | | | | |
| Example 20 | Ethylene carbonate | (80) | $LiBF_4$ | 1.5 | 230 | 6.1 | 60 | 0.7 |
| | 1,2-Dimethoxyethane | (20) | | | | | | |
| Example 21 | Ethylene carbonate | (50) | $LiPF_6$ | 0.8 | 300 | 2.0 | 30 | 1.2 |
| | 1,2-Dimethoxyethane | (50) | | | | | | |
| Example 22 | Ethylene carbonate | (80) | $LiCF_3SO_3$ | 1.0 | 220 | 8.3 | 60 | 0.5 |
| | Dioxolan | (20) | | | | | | |
| Example 23 | 2-Methyl-γ-butyrolactone | (40) | $LiN(CF_3SO_2)_2$ | 1.0 | 270 | 4.1 | 30 | 0.9 |
| | Acetonitrile | (60) | | | | | | |
| Example 24 | Ethylene carbonate | (30) | $LiClO_4$ | 2.8 | 180 | 3.3 | 30 | 0.7 |
| | 2-Methyltetrahydrofuran | (70) | | | | | | |

*: (mol/liter),
**: ($10^{-6}$ dyne/cm$^2$),
***: (−20° C., $10^{-3}$ S/cm)

From the evaluation results, it was found that the cross-linked polymer solid electrolyte manufactured according to Patent Publication (koukoku) No. 5-74195; that is, a block-graft copolymer before being cross-linked used in Example 1. When the film was immersed in the electrolytic solution composed of polyethylene glycol dimethylether (Mn=350) and $LiClO_4$, the film took for about 2 minutes to be dissolved. When the film was immersed in the nonaqueous electrolytic solution having a composition used in Example 21, the film dissolved within about 30 seconds.

In the embodiment, a description is given of the case where the cross-linked polymer solid electrolyte is used as an element of secondary cells. However, the cross-linked polymer solid electrolyte of the present invention can be effectively used in various types of solid electrochemical elements such as primary cells, capacitors, electrochromic displays, and sensors.

The Second Aspect of the Present Invention, Embodiments and Examples Thereof:

The inventors of the present invention conducted extensive studies in an attempt to improve a solid electrolyte comprising a block-graft copolymer and an alkali metal salt so as to obtain a thin solid cell having excellent mechanical strength and highly improved cell characteristics. As a result, they found that their end is attained by combining a solid electrolyte with an electrically insulating plastic porous membrane and an aprotic organic solvent to thereby obtain a composite solid electrolyte and by employing the thus-obtained composite solid electrolyte in a positive electrode and a negative electrode, thus achieving the present invention.

The composite solid electrolyte of the present invention comprises a) an electrically insulating material, b) an alkali metal salt, c) a block-graft copolymer, and d) an aprotic organic solvent. The electrically insulating material can be employed any material which has through-spaces extending between both sides thereof. Examples of such material include electrically non-conductive porous membranes, nonwoven fabrics, and mesh-like woven fabrics. Examples of such porous membranes include plastic separators (polypropylene separators, polyethylene separators, or polypropylene-polyethylene separator composites) for use in commercial lithium cells, and Teflon, polyester, polyamide, or polyimide filter materials. Examples of such nonwoven fabrics include separators for use in commercial lithium cells. Examples of such mesh-like woven fabrics include screen meshes (formed from nylon, polyester, or silk). The electrically insulating material is selected according to an application of the solid electrolyte. When the solid electrolyte is to be used in the form of a membrane, a plastic porous membrane is suited for the electrically insulating material in view of the support strength and electrochemical stability of the solid electrolyte. In this case, the thickness of the solid electrolyte membrane is preferably 10 $\mu$m to 25 $\mu$m.

Examples of the alkali metal salt include alkali halides such as $LiClO_4$, $LiCF_3SO_3$, $LiBF_4$, $LiPF_6$, $LiAsF_6$, $LiAlCl_4$, LiBr, LiSCN, LiI, $LiC(CF_3SO_2)_3$, $LiN(CF_3SO_2)_2$, $NaClO_4$, NaI, $NaBF_4$, NaSCN, $NaPF_6$, KSCN and $KPF_6$; and alkaline salts having organic acid anions. They are used singly or in combination. They, together with a polyalkylene oxide, form a metal complex, thereby increasing the flow rate of metal ions and thus implementing characteristics of a solid electrolyte.

The alkali metal salt is mixed with the block-graft copolymer and the aprotic organic solvent in an amount of 1 to 80 wt. % based on the total weight, preferably 3 to 20 wt. %. If the alkali metal salt content is not greater than 1 wt. %, the number of ion carriers in an electrolyte is reduced, resulting in a failure to obtain high ionic conductivity. By contrast, if the alkali metal salt content is in excess of 80 wt. %, the salt will precipitate due to saturated dissolution, resulting in a reduction in membrane strength.

The block-graft copolymer used in the composite solid electrolyte of the present invention is the same as the block-graft copolymer X described above, so that the explanation of the block-graft copolymer is omitted here.

Examples of the aprotic organic solvent usable in the present invention include cyclic esters such as $\gamma$-butyrolactone, ethylene carbonate, propylene carbonate, butylene carbonate, and 2-methyl-$\gamma$-butyrolactone; and sulfur-containing compounds such as dimethyl sulfoxide, sulfolane, and 2-methyl-sulfolane. They are used singly or in combination.

The aprotic organic solvent is mixed with the block-graft copolymer in an amount of 10 to 1000 wt. % based on the weight of the copolymer, preferably 100 to 500 wt. %. If the aprotic organic solvent content is less than 10 wt. %, the activity of lithium ions is suppressed, resulting in a reduction in ionic conductivity. By contrast, if the aprotic organic solvent content is in excess of 1000 wt. %, the copolymer serving as a matrix becomes unable to hold the organic solvent, resulting in oozing of the solvent or oozing of the fluidized copolymer from the electrolyte membrane.

Next will be described an example of the method of manufacturing a composite solid electrolyte according to the present invention.

First, the aforementioned block-graft copolymer is dissolved in an appropriate organic solvent to thereby obtain a polymer solution. The organic solvent is selected from cyclic ether compounds such as 1,4-dioxane, 1,3-dioxolan, and THF. The copolymer is dissolved preferably in an amount of 5 wt. % to 20 wt. %. Any other solvent may be used so long as it can dissolve the block-graft copolymer of the present invention. Examples of such solvent include chain ester compounds such as DMC and DEC; chain ether compounds such as DME; nitryl compounds such as AN; chlorine compounds such as chloroform and methylene chloride; and NMP and DMF. These solvents may be used singly or in combination.

Next, the aforementioned electrically insulating material is immersed in the above polymer solution so as to obtain a polymer composite. When a plastic porous membrane is employed as the electrically insulating material, it is important to make the polymer solution permeate the membrane deep into pores through reduction of pressure or application of ultrasonic. An alkali metal salt may be previously added into the polymer solution. Subsequently, the organic solvent is evaporated from the electrically insulating material soaked with the polymer solution. Then, the electrically insulating material is immersed in an aprotic organic solvent so as to impregnate the electrically insulating material with the aprotic organic solvent, thereby obtaining the composite solid electrolyte of the present invention.

If water is present in the composite solid electrolyte, the composite solid electrolyte will not exhibit expected performance. Thus, water must not be present in raw materials, and water must be inhibited from entering the manufacturing procedure. Accordingly, raw materials must be sufficiently dried in advance. A solution must be sufficiently dehydrated through use of molecular sieves, metal lithium, or the like. The block-graft copolymer, the electrically insulating material, equipment and materials, and other instruments must be dried under reduced pressure while they are being heated, thereby preventing water from adhering thereto. In a step involving manual working, an argon gas glove box must be used against entry of water, and the dew point of the interior of the box must be maintained at not higher than $-60°$ C., particularly preferably not higher than $-100°$ C.

An example of the method of manufacturing a composite solid electrolyte according to the present invention has been described above. However, the method is not limited thereto. Any manufacturing method may be employed so long as essential conditions of the present invention are included.

Next will be described the structure of a thin solid cell of the present invention and the method of manufacturing the thin solid cell.

The thin solid cell of the present invention is obtained by arranging the aforementioned composite solid electrolyte, the active material of a positive electrode, and the active material of a negative electrode in layers. Adding an ionic conducting compound similar to an electrolyte component to an electrode effectively activates a lithium-related oxidation-reduction reaction in the electrode. The method of manufacturing an electrode material will next be described.

First, the aforementioned block-graft copolymer X and the aforementioned alkali metal salt are dissolved in the aforementioned organic solvent similar to that used in the manufacture of the composite solid electrolyte.

As in the manufacture of the composite solid electrolyte, the alkali metal salt is mixed with the block-graft copolymer X in an amount of 1 wt. % to 80 wt. %, preferably 3 wt. % to 20 wt. %, based on the total weight of ethylene oxide derivatives contained in the block-graft copolymer X. If the alkali metal salt content is less than 1 wt. %, the number of ion carriers in an electrolyte is reduced, resulting in a reduction in electrode utilization rate. By contrast, if the alkali metal salt content is in excess of 80 wt. %, the salt precipitates due to saturated dissolution, resulting in a reduction in electrode strength.

To the thus-obtained solution is added the active material of an electrode to thereby obtain an electrode composition slurry. Examples of the active material of a positive or negative electrode used in the thin solid cell of the present invention include individual metals such as metallic lithium, metallic silver, and metallic zinc; alloys such as Li—Al; carbon materials such as graphite, carbon black, graphite fluoride, and polyacetylene; metal oxides such as $MnO_2$, $CoO_2$, $V_2O_5$, $V_6O_{13}$, $TiO_2$, $WO_2$, $Cr_2O_5$, $Cr_3O_8$, $CuO$, $Cu_2V_2O_7$, $Bi_2O_3$, $Bi_2PB_2O_5$, and $Mo_8O_2$; chalcogenides such as $TiS_2$, $TiS_3$, $MoS_2$, $CuCo_2S_4$, $VSe_2$, $NbSe_2CrS_2$, and $NbSe_3$; oxyacid salts of silver such as $Ag_2CrO_4$, $Ag_2MoO_4$, $AgIO_3$, and $Ag_4P_2O_7$; and π-conjugated polymers such as polyaniline, polypyrrole, polythiophene, and poly-p-phenylene.

The active material of an electrode is mixedly added to the solution in an amount of 40 wt. % to 90 wt. %, preferably 50 wt. % to 70 wt. %, based on other solute components. If the active material content is in excess of 90 wt. %, the electrode utilization rate is reduced. By contrast, if the active material content is less than 40 wt. %, the amount of oxidation-reduction reaction in an electrode is reduced, resulting in a reduction in cell capacity. The electrode composition slurry is applied onto an electrode support, a Teflon plate, or the like. Then, the solvent is evaporated to obtain a positive or negative electrode.

In the present invention, a conducting agent may be mixedly added to the electrode composition solution as needed. Examples of such a conducting agent include natural graphite, coke, carbon black, artificial graphite such as carbon materials obtained through thermal decomposition, and kish graphite. They are used singly or in combination.

Next, the positive electrode, the composite solid electrolyte, and the negative electrode are arranged in layers in this order, obtaining a laminate. This laminate is packed with a sealing material. Then, positive and negative terminals are attached to the laminate to thereby obtain the thin solid cell of the present invention.

Examples of the sealing material include a thin aluminum membrane. A thermoplastic such as polyethylene may be used as a sealing material for the purpose of sealing the peripheral portion of the cell.

The second aspect of the present invention will next be described by way of example, which should not be construed as limiting the invention.

In the following examples, a block copolymer is represented with components connected by -b-. For example, a 3-component block copolymer composed of polystyrene, poly-p-hydroxystyrene, and polystyrene is represented by poly(styrene-b-p-hydroxystyrene-b-styrene).

Before Examples and Comparative Examples are described, the methods of evaluating an electrolyte and a cell will be described.

Evaluation of Composite Solid Electrolytes:

Amount of a carried electrolyte component: 20 electrolytes, each 10 cm square, were manufactured according to each of Examples and Comparative Examples. These electrolytes were measured for the amount of a carried electrolyte component. Standard deviations of measurements were examined.

Electrochemical stability: 20 cells were manufactured through use of electrolyte membranes obtained according to each of Examples and Comparative Examples. $LiCoO_2$ in pellets was used as the active material of a positive electrode. Natural graphite in pellets was used as the active material of a negative electrode. These electrode materials and each of the electrolyte membranes were arranged in layers to form a cell. The cells were placed in a thermostat of 60° C. and allowed to stand for one month. Subsequently, the cells were measured for an open-circuit voltage. Averages and standard deviations of measurements Evaluation of Thin Solid Cells:

(1) Initial discharge capacity: 10 cells were manufactured for each of Examples and Comparative Examples. The cells were measured for an initial discharge capacity at a discharge current of 0.1 mA/cm². Averages of measurements were examined.

(2) Cycle characteristic: The cells were evaluated for a cycle characteristic at a charge-discharge current density of 0.1 mA/cm² and a cut voltage of 4.3 to 3 V. A capacity reduction rate at 300 cycles was examined.

EXAMPLE 25

(Manufacture of a composite solid electrolyte):

1 part of a block-graft copolymer having a molecular weight of 350,000 wherein ethylene oxide (number of chains: 25; 100% methoxy termination) is grafted on portion A of a B-A-B triblock copolymer (styrene (number of chains: 500)-hydroxystyrene (number of chains: 250)-styrene (number of chains: 500)), 0.08 parts of $LiClO_4$, and 20 parts of 1,3-dioxolan were mixed to obtain a polymer solution. Celgard 2500 (a tradename of Hexyst Corp. for a porous membrane formed from polypropylene; membrane thickness: 25 μm; numerical aperture: 45%) was immersed in the polymer solution under reduced pressure. Celgard 2500 was then removed from the polymer solution and dried to thereby evaporate the solvent. Celgard 2500 was further dried at 90° C. under reduced pressure for 12 hours to thereby obtain a 90° C. under reduced pressure for 12 hours to thereby obtain a composite membrane. The thus-obtained composite membrane was immersed in a solution of 1M-$LiClO_4$ in propylene carbonate to thereby obtain a composite polymer solid electrolyte having a thickness of 35 μm. The composite membrane carried polymer-$LiClO_4$ in an amount of 200 μg per unit area (cm²) of Celgard 2500. After immersion in the propylene carbonate solution, the composite membrane carried an electrolyte component in an amount of 800 µg/cm$^2$, and the standard deviation of the amount of the carried electrolyte component was 50 µg. A disk having a diameter of 10 mm was blanked out from the electrolyte. The electrolyte disk was intercalated between lithium foils and underwent impedance measurement. The specific ionic conductivity was $1 \times 10^{-3}$ S/cm (25° C.). The open-circuit voltage indicative of electrochemical stability was 4.1 V on average and 0.2 V in standard deviation.

EXAMPLE 26
(Manufacture of a composite solid electrolyte):

1 part of a block-graft copolymer having a molecular weight of 920,000 wherein ethylene oxide (number of chains: 30; the termini were 100% methoxylated) is grafted on portion A of a B-A-B triblock copolymer (styrene (number of chains: 1000)-hydroxystyrene (number of chains: 500)-styrene (number of chains: 1000)), 0.08 parts of LiCF$_3$SO$_3$, and 20 parts of 1,4-dioxane were mixed to obtain a polymer solution. Celgard 2500 (a porous membrane formed of polypropylene similar to that used in Example 25; membrane thickness: 25 µm; numerical aperture: 45%) was immersed in the polymer solution under reduced pressure. Celgard 2500 was then removed from the polymer solution and dried to thereby evaporate the solvent. Celgard 2500 was further dried at a temperature of 90° C. under reduced pressure for 12 hours to thereby obtain a composite membrane. The thus-obtained composite membrane was immersed in a solution of 1M-LiCF$_3$SO$_3$ in a mixture of ethylene carbonate and propylene carbonate (volume ratio 1:1) to thereby obtain a composite polymer solid electrolyte having a thickness of 35 µm. The composite membrane carried polymer-LiCF$_3$SO$_3$ in an amount of 250 µg per unit area (cm$^2$) of Celgard 2500. After immersion in the propylene carbonate solution, the composite membrane carried an electrolyte component in an amount of 900 µg/cm$^2$, and the standard deviation of the amount of the carried electrolyte component was 60 µg. A disk having a diameter of 10 mm was blanked out from the electrolyte. The electrolyte disk was intercalated between lithium foils and underwent impedance measurement. The specific ionic conductivity was $1 \times 10^{-3}$ S/cm (25° C.). The open-circuit voltage indicative of electrochemical stability was 4.1 V in average and 0.2 V on standard deviation.

COMPARATIVE EXAMPLE 3
(Manufacture of a composite solid electrolyte):

0.98 parts of polyethylene glycol monoacrylate (molecular weight: 350) in place of the block-graft copolymer used in Example 25, 0.02 parts of trimethylol propane acrylate, and 0.002 parts of benzoin propyl ether were mixed. Celgard 2500 was immersed in the mixture without using a solvent. Celgard 2500 was then irradiated with ultraviolet light so as to cure the monomer component, thereby obtaining a polymer-Celgard 2500 composite. The thus-obtained composite membrane was immersed in a solution of 1M-LiClO$_4$ in propylene carbonate to thereby obtain a composite solid electrolyte. The composite solid electrolyte carried a polymer component in an amount of 100 lig per unit area (cm$^2$) of Celgard 2500. After immersion in the propylene carbonate solution, the composite solid electrolyte carried an electrolyte component in an amount of 600 µg/cm$^2$, and the standard deviation of the amount of the carried electrolyte component was 100 µg. The specific ionic conductivity of the composite solid electrolyte was $1 \times 10^{-3}$ S/cm (room temperature). The open-circuit voltage indicative of electrochemical stability was 3.7 V on average and 0.7 V in standard deviation.

As seen from measurements in Examples 25 and 26 and Comparative Example 3, in the composite solid electrolyte of the present invention, a phenyl group is included in a polymer; thus, a relatively large amount of an electrolyte component is carried in a uniformly distributed manner.

Also, in the composite solid electrolyte of the present invention, an acrylic linkage is not included in a polymer. Thus, even when the composite solid electrolyte is in contact with a catalytic compound such as LiCoO$_2$ or graphite and exposed to as high a voltage as 4 V, a polymer component in the electrolyte is not decomposed. Accordingly, a lithium ion cell employing the composite solid electrolyte of the present invention exhibits a stable open-circuit voltage.

EXAMPLE 27
(manufacture of a thin solid cell):

1 part of the block-graft copolymer obtained in Example 25, 0.08 parts of LiClO$_4$, 15 parts of 1,4-dioxane, and 5 parts of ethanol were mixed to obtain a uniform solution. 15 parts of amorphous V$_2$O$_5$ obtained by melting V$_2$O$_5$ through application of heat and then water-quenching the same and 1 part of acetylene black serving as a conducting agent were mixed. The mixture serving as the active material of a positive electrode was gradually added to the solution to obtain an electrode composition slurry. The electrode composition slurry was applied onto a stainless steel plate, and the solvent was evaporated to obtain a positive electrode composition having a thickness of 100 µm. A composite solid electrolyte used was identical to that used in Example 25. A lithium foil measuring 7.8 mm×4.8 mm×20 µm (thickness) was used as the active material of a negative electrode. The positive electrode composition measuring 8 mm×5 mm and the composite solid electrolyte measuring 8.2 mm×4.9 mm were placed on the lithium foil in layers to form a cell body. The thus-formed cell body was intercalated between current collectors, each comprising a stainless steel foil and a nickel mesh, the nickel mesh being laser-bonded onto the stainless foil. The edges of the cell body were sealed with modified polypropylene, thereby obtaining a card-sized film cell measuring 8.5 cm×5.4 cm. The cell exhibited an initial discharge capacity of 140 mmAH and a capacity reduction rate of 45%. The cell was manufactured within a glove box whose internal atmosphere was of argon and had a dew point of not higher than −85° C.

EXAMPLE 28
(Manufacture of a thin solid cell):

1 part of the block-graft copolymer obtained in Example 26, 0.07 parts of LiPF$_6$, and 20 parts of 1,3-dioxolan were mixed to obtain a uniform solution. 15 parts of LiCoO$_2$ and 1 part of acetylene black serving as a conducting agent were mixed. The mixture serving as the active material of a positive electrode was gradually added to the solution to obtain an electrode composition slurry. The electrode composition slurry was applied onto a stainless steel plate, and the solvent was evaporated to obtain a positive electrode composition having a thickness of 100 µm. Celgard 2500 was combined with the electrolyte material identical to that of Example 26 in a manner similar to that of Example 26, thereby obtaining a composite membrane. The composite membrane was immersed in a solution of 1M-LiPF$_6$ in a mixture of ethylene carbonate and propylene carbonate (volume ratio 1:1) to thereby obtain a composite solid electrolyte (membrane thickness: 40 µm). 1 part of the block-graft copolymer obtained in Example 26, 0.07 parts of LiPF$_6$, and 20 parts of 1,3-dioxolan were mixed to obtain a uniform solution. 15 parts of natural graphite (density: 1.90 g/cm$^3$) and 1 part of acetylene black serving as a conducting agent were mixed. The mixture serving as the active material of a negative electrode was gradually added to the solution to obtain an electrode composition slurry. The electrode composition slurry was applied onto a stainless steel plate, and the solvent was evaporated to obtain a negative electrode composition having a thickness of 100 μm. The positive electrode composition, the composite solid electrolyte, and the negative electrode composition were arranged in layers to form a cell body. The thus-formed cell body was intercalated between current collectors, each comprising a stainless foil and a nickel mesh, the nickel mesh being laser-bonded onto the stainless foil. The edges of the cell body were sealed with modified polypropylene, thereby obtaining a card-sized film cell measuring 8.5 cm×5.4 cm. The cell exhibited an initial discharge capacity of 130 mmAH and a capacity reduction rate of 50%.

COMPARATIVE EXAMPLE 4
(Manufacture of a thin solid cell):

An electrode composition was obtained in a manner similar to that of Example 28 except for use of 1 part of methoxypolyethylene glycol methacrylate (molecular weight: 300), which is a photo-setting monomer and was used in place of the block-graft copolymer of the present invention, and 0.5 parts of polyethylene glycol dimethacrylate (molecular weight: 330). 0.1% of benzoin was added to the electrode composition. The mixture was irradiated with ultraviolet light for 30 minutes to set the monomer, thereby obtaining positive and negative electrode compositions having a thickness of 100 μm. The positive and negative electrode compositions and the electrolyte used in Example 28 were combined to thereby obtain a card-shaped solid cell similar to that of Example 28. The thin solid cell exhibited an initial discharge capacity of 70 mmAH and a capacity reduction rate of 85%.

As described above, in the thin solid cell of the present invention, a polymer carried by a polymer-separator composite contains a phenyl group. Thus, high adhesion is established between the separator and the polymer. This reduces the internal resistance of a cell and variation of the internal resistance. Accordingly, the cell of the present invention stably exhibits higher initial discharge capacity.

Also, the solid cell of the present invention exhibits excellent cycle characteristic as compared with a conventional solid cell employing an acrylic-group-containing polymer electrolyte. This is because no inclusion of an acrylic linkage enables an electrolyte polymer to less deteriorate even when it is in contact with a catalytic electrode material and exposed to as high a voltage as approximately 4 V.

The present invention is not limited to the above-described embodiments. The above-described embodiments are mere examples, and those having the substantially same structure as that described in the appended claims and providing the similar action and effects are included in the scope of the present invention.

For example, the above embodiments are described while mentioning use of a composite solid electrolyte of the present invention in a thin solid cell. However, the present invention is not limited thereto, but may be effectively applicable to various other solid electrochemical elements such as primary cells, capacitors, electrochromic displays, and sensors.

What is claimed is:

1. A method of manufacturing a cross-linked polymer solid electrolyte, said method comprising the steps of
providing a block-graft copolymer composed of a polymer block chain A and a polymer block chain B at a component ratio of 1:30 to 30:1 and having a degree of polymerization of not less than 310, the polymer block chain A having a recurrent structure unit as represented by formula I below and a degree of polymerization of not less than 10

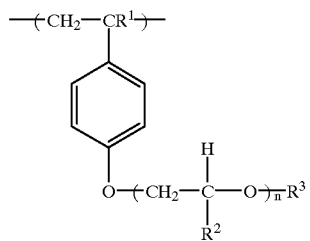

wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and the graft chain moiety of the formula I as represented below has a number average molecular weight of 45 to 4400,

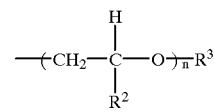

the polymer block chain B having a recurrent structure unit as represented by formula II below and a degree of polymerization of not less than 300

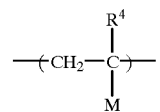

wherein $R^4$ represents a hydrogen atom, a methyl group, or an ethyl group; M represents a group represented by $—CH=CH_2$, $—C(CH_3)=CH_2$, $—COOCH_3$, or $—COOC_2H_5$, a phenyl group, or a substituted phenyl group;

adding a crosslinking agent to the block-graft copolymer;

irradiating a high energy ray of a dose of 10 Mrad or more to the block-graft polymer in order to crosslink the entire system; and adding a nonaqueous electrolytic solution to the block-graft polymer.

2. A method of manufacturing a cross-linked polymer solid electrolyte according to claim 1, wherein said crosslinking agent contains a vinyl monomer having two or more functional groups and optionally contains a vinyl monomer having a single functional group.

3. A method of manufacturing a cross-linked polymer solid electrolyte according to claim 2, wherein said high energy ray is an electron ray, an ultraviolet ray, or a heat ray.

4. A method of manufacturing a cross-linked polymer solid electrolyte according to claim 3, wherein said nonaqueous electrolytic solution is composed of polyalkylene oxide and a lithium inorganic salt.

5. A method of manufacturing a cross-linked polymer solid electrolyte according to claim 3, wherein said nonaqueous electrolytic solution is composed of a lithium inorganic salt and an ester selected from the group consisting of high-boiling-point cyclic carbonic acid esters, low-boiling-point linear esters, and carbonic acid esters.

6. A method of manufacturing a cross-linked polymer solid electrolyte according to claim 2, wherein said non-aqueous electrolytic solution is composed of polyalkylene oxide and a lithium inorganic salt.

7. A method of manufacturing a cross-linked polymer solid electrolyte according to claim 2, wherein said non-aqueous electrolytic solution is composed of a lithium inorganic salt and an ester selected from the group consisting of high-boiling-point cyclic carbonic acid esters, low-boiling-point linear esters, and carbonic acid esters.

8. A method of manufacturing a cross-linked polymer solid electrolyte according to claim 1, wherein said high energy ray is an electron ray, an ultraviolet ray, or a heat ray.

9. A method of manufacturing a cross-linked polymer solid electrolyte according to claim 8, wherein said non-aqueous electrolytic solution is composed of polyalkylene oxide and a lithium inorganic salt.

10. A method of manufacturing a cross-linked polymer solid electrolyte according to claim 8, wherein said non-aqueous electrolytic solution is composed of a lithium inorganic salt and an ester selected from the group consisting of high-boiling-point cyclic carbonic acid esters, low-boiling-point linear esters, and carbonic acid esters.

11. A method of manufacturing a cross-linked polymer solid electrolyte according to claim 1, wherein said non-aqueous electrolytic solution is composed of polyalkylene oxide and a lithium inorganic salt.

12. A method of manufacturing a cross-linked polymer solid electrolyte according to claim 1, wherein said non-aqueous electrolytic solution is composed of a lithium inorganic salt and an ester selected from the group consisting of high-boiling-point cyclic carbonic acid esters, low-boiling-point linear esters, and carbonic acid esters.

13. A cross-linked polymer solid electrolyte manufactured in accordance with the method of claim 1.

14. A composite solid electrolyte for use in a solid electrochemical element, comprising:
   a) an electrically insulating material selected from the group consisting of an electrically non-conductive porous membrane, nonwoven fabric, and mesh woven fabric;
   b) an alkali metal salt;
   c) a block-graft copolymer composed of a polymer block chain A and a polymer block chain B at a component ration of 1:30 to 30:1 and having a degree of polymerization of not less than 310, the polymer block chain A having a recurrent structure unit as represented by formula I below and a degree of polymerization of not less than 10

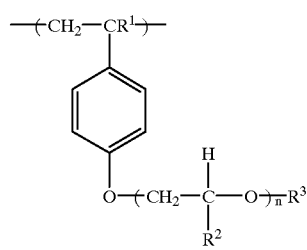

wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and the graft chain moiety of the formula I as represented below has a number average molecular weight of 45 to 4400,

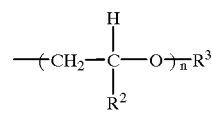

the polymer block chain B having a recurrent structure unit as represented by formula II below and a degree of polymerization of not less than 300

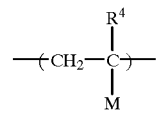

wherein $R^4$ represents a hydrogen atom, a methyl group, or an ethyl group; M represents a group represented by $-CH=CH_2$, $-C(CH_3)=CH_2$, $-COOCH_3$, or $-COOC_2H_5$, a phenyl group, or a substituted phenyl group; and d) an aprotic organic solvent selected singly or in combination from the group consisting of γ-butyrolactone, ethylene carbonate, propylene carbonate, butylene carbonate, 2-methyl-γ-butyrolactone, dimethyl sulfoxide, sulfolane, and 2-methyl-sulfolane.

15. A solid electrochemical element selected from the group consisting of a thin solid cell (secondary cell), a primary cell, a capacitor, an electrochromic display, and a sensor, said solid electrochemical element being fabricated through use of said composite solid electrolyte of claim 14.

16. A thin solid cell comprising the composite solid electrolyte of claim 14, a positive electrode, and a negative electrode, wherein the positive electrode comprises a solid electrolyte, which in turn comprises at least the block-graft copolymer of claim 14 and an alkali metal salt, and a positive electrode active material, and wherein the negative electrode comprises a solid electrolyte, which in turn comprises at least the block-graft copolymer of claim 14 and an alkali metal salt, and a negative electrode active material.

17. A thin solid cell comprising the composite solid electrolyte of claim 14, a positive electrode, and a negative electrode, wherein the positive electrode comprises a solid electrolyte, which in turn comprises at least the block-graft copolymer of claim 14 and an alkali metal salt, and a positive electrode active material.

* * * * *